United States Patent
Kuntz

(10) Patent No.: US 7,645,046 B1
(45) Date of Patent: Jan. 12, 2010

(54) FLASH PHOTOGRAPHY REFLECTOR SYSTEM

(76) Inventor: Preston Jay Kuntz, 811 N. Detroit St., Los Angeles, CA (US) 90046

( * ) Notice: Subject to any disclaimer, the term of this patent is extended or adjusted under 35 U.S.C. 154(b) by 0 days.

(21) Appl. No.: 12/288,550

(22) Filed: Oct. 20, 2008

(51) Int. Cl.
*G03B 15/02* (2006.01)

(52) U.S. Cl. .......................... 362/18; 362/16; 362/298; 396/200; 396/544

(58) Field of Classification Search ............. 362/16–18, 362/298, 301, 302; 396/174, 175, 198, 200, 396/544
See application file for complete search history.

(56) References Cited

U.S. PATENT DOCUMENTS

| | | | |
|---|---|---|---|
| 3,258,586 A | 6/1966 | Blizzard | |
| 4,078,170 A | 3/1978 | Sloop | |
| 4,122,333 A | 10/1978 | Crouse | |
| 4,524,405 A * | 6/1985 | Heard | 362/18 |
| 5,337,104 A | 8/1994 | Smith et al. | |
| 5,406,343 A | 4/1995 | Stephenson | |
| 5,778,264 A | 7/1998 | Kean | |
| 6,094,545 A | 7/2000 | Petitjean | |
| 7,360,909 B1 | 4/2008 | Hughes | |

* cited by examiner

*Primary Examiner*—Stephen F Husar
(74) *Attorney, Agent, or Firm*—Gene Scott; Patent Law & Venture Group

(57) ABSTRACT

A flash photography reflector system is mounted on a camera of the type wherein the camera's flash unit is positionable above the camera's accessory shoe. A pair of reflectors are mounted on a support strut which engages the accessory shoe. The reflectors are in spaced apart positions and mutually facing with the flash unit positioned between them. The flash beam is directed at a first one of the reflectors, which then directs the flash beam to a larger one of the reflectors, which, in turn, directs the flash beam outwardly toward the subject of the photograph. The first and second reflectors expand the beam so that the final outgoing flash beam is many times broader then the beam that would proceed from the camera's flash unit alone.

10 Claims, 4 Drawing Sheets

# FLASH PHOTOGRAPHY REFLECTOR SYSTEM

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

REFERENCE TO A "MICROFICHE APPENDIX"

Not applicable.

SEQUENCE LISTING

Not applicable.

BACKGROUND OF THE INVENTION

1. Field of the Present Disclosure

This disclosure relates generally to devices for redirecting light from a camera flash unit, and more particularly to a reflector unit capable of adapting camera flash light output as to direction, scope, color and other features and more especially to producing a softer but wider light beam.

2. Description of Related Art Including Information Disclosed Under 37 CFR 1.97 and 1.98

Hughes, U.S. Pat. No. 7,360,909, discloses and teaches a new and improved photographic flash attachment, a light reflecting apparatus that is lightweight, flexible, easily attached and/or detached from a camera flash and conveniently stored in a rolled or folded configuration. The disclosed flash reflector is configured from a thin, flexible, planar polyurethane foam material, or any other suitable material, into an adjustable, generally concave configuration whereby adjusting the reflectors shape adjusts the power of the light it reflects to balance with the existing natural light or bounce off a ceiling thereby eliminating and/or reducing shadows about the photographic subject.

Petitjean, U.S. Pat. No. 6,094,545, discloses an illumination directing apparatus for use with photographic cameras having a lens and a flash, and including at least one reflecting member for reflecting light from the flash of the camera toward a subject to be photographed. The apparatus is configured so as to provide light directly from the flash (either diffused or not) as well as reflected light from the flash (either diffused or not) directed at the subject and essentially from respective sides of the lens of the camera to thereby provide more even illumination on the subject.

Kean, U.S. Pat. No. 5,778,264, discloses a photographic reflector to convert a forward-illuminating flash unit into one which produces reflected light or for use directly with a bounce-head flash unit. The reflector includes an internal reflective hood with an attachment so as to enable it to be secured to a flash unit. A mirror is provided which is angled between thirty degrees and sixty degrees inclusive with respect to a forward facing light-emitting surface of the flash unit when the reflector is secured thereto. In this way, the flash of light is directed upwardly by the mirror into the internally reflective hood so as to produce a reflected flash of light for illumination of a photographic subject.

Stephenson, U.S. Pat. No. 5,406,343, discloses a main light reflector supported for movement between a direct flash position for reflecting light output from a source of flash illumination directly towards a subject to be photographed and an indirect flash position for reflecting light output from the flash source onto a nearby surface and thence directly towards a subject to be photographed. A supplementary light reflector is supported for movement to a direct flash position for reflecting light output from the flash source directly towards a subject to be photographed. The supplementary reflector is moved to its direct flash position in response to movement of the main reflector to its indirect flash position, whereby combined direct and indirect illumination of a subject to be photographed can be achieved.

Smith et al., U.S. Pat. No. 5,337,104, discloses an apparatus for redirecting beams of light emanating from the flash of a camera so as to avoid the creation of "red-eye" in a photograph. The apparatus redirects the beams of lights so as to be distanced even further from the central axis of the camera lens. To provide the full effect of the flash, the apparatus redirects the beams of light in a direction parallel to the original direction the light beams travel off from the flash and to the central axis of the lens. The apparatus includes a main body which forms an enclosure with an inlet and outlet opening and is attached to the camera such that the inlet opening is aligned with and covers the camera's flash. The main body includes at least two reflective surfaces for redirecting the flash beam from a first direction to a second direction and then from the second direction to a third direction exiting the main body. The device can be releasably mounted to existing flash cameras (including pop-out flash members). It can also be built into new compact cameras and act as a sliding lens cover and power switch. With the built-in design, the flash of the camera can be directed either vertically or to one side of the camera and a built-in light shifter with single reflective surface is provided to redirect the light parallel and far removed from the central axis of the lens.

Crouse, U.S. Pat. No. 4,122,333, discloses a reflective device for use with a source of flash illumination, and method, for providing indirect, or, simultaneous direct and indirect illumination of a scene to be photographed. A reflective member, interposed at an angle between the flash source and scene, intercepts flash illumination and reflectively redirects at least a percentage of it for indirect illumination. Reflective member passing means allow some flash illumination therethrough for simultaneous direct illumination, the amount being variable by regulating means such as movable shutters or polarizer sheets mounted on the reflective member. Means are provided for varying the angle of interposition of and for rotating the reflective member. Mounting means for mounting reflective members onto flash units accommodate various removable reflective members.

Sloop, U.S. Pat. No. 4,078,170, discloses an apparatus for use with a camera and flash unit to provide diffused light, including a support frame for holding a flash unit so it emits light upwardly, and for holding a reflector screen above the flash unit and facing forwardly and downwardly to reflect light from the flash unit in a largely forward direction. The reflector screen includes a sheet of flexible reflective material and a resilient wire reflector frame for holding the reflective sheet taut and for mounting it on the support frame.

Blizzard, U.S. Pat. No. 3,258,586, discloses a bounce light beam deflector for flash and strobe lights.

The related art described above discloses camera accessories capable of expanding a flash beam, of redirecting a flash beam and of softening a flash beam. However, the prior art fails to disclose a reflector system that may be integrated with a hot or cold camera shoe to place reflectors in an optimal position for greatly broadening the flash light beam, changing its color, intensity, redirecting its path and other adjustments and lighting effects. The present disclosure distinguishes over the prior art providing heretofore unknown advantages as described in the following summary.

BRIEF SUMMARY OF THE INVENTION

This disclosure teaches certain benefits in construction and use which give rise to the objectives described below.

With the advent of digital technology in relatively inexpensive cameras that provide fully automated operation, i.e., auto-focus and aperture setting, taking pictures has become a common past time. Most cameras have built-in flash devices making indoor and low-light photography easily mastered by even the most inexperienced amateur. However, with the miniaturization of cameras both the flash mechanism and its reflector have also become quite small although light output has increased through technical improvements. Large light output from relatively small built-in reflectors tends to produce a flat image since little, if any, gray tones appear around the edges of objects. Built-in camera flash devices have many limitations including the inability to: select flash direction other then at the point of focus, produce bounce lighting, change lighting color, throttle flash magnitude, increase or restrict breath of field, soften lighting, and other effects.

The present invention is a camera accessory that provides a solution to the many needs in flash photography not presently available. A reflector system provides a pair of reflector assemblies mounted on a strut in mutually facing positions. The strut is enabled for mounting in the accessory shoe of the camera, and with those cameras that have built-in flash devices that can be positioned above the camera shoe, the strut permits a smaller one of the reflector assemblies (forward reflector) to be positioned facing the built-in flash device, while a much larger one of the reflectors (rearward reflector is positioned behind the flash device and is therefore able to receive light bounced off the forward reflector and then direct the light toward the photographic subject.

The reflector assemblies have snap-in reflectors that may be quickly and easily changed so that one may use a reflector set that selects flash direction other then at the point of focus, produces bounce lighting, changes lighting color, throttles flash magnitude, increases or restricts breath of field, softens lighting, or produces other desired light effects. The reflector assemblies are adjustable as to the height and can easily be adjustable also for changing the direction of light reflection. The invention is easily assembled and broken down for convenience in use and comprises inexpensively manufactured parts. The camera's flash beam is directed at a first one of the reflectors, which then directs the flash beam to the second one of the reflectors, which, in turn, directs the flash beam outwardly toward the subject of the photograph. The first and second reflectors expand the beam so that the final outgoing flash beam is many times broader then the beam that would proceed from the camera's flash unit alone.

A primary objective inherent in the above described apparatus and method of use is to provide advantages not taught by the prior art.

Another objective is provide a device that improves flash lighting effects for ordinary commercial camera equipment.

A further objective is to provide such a device that is able to be easily assembled and mounted onto a camera utilizing the camera's existing accessory shoe.

Other features and advantages of the present invention will become apparent from the following more detailed description, taken in conjunction with the accompanying drawings, which illustrate, by way of example, the principles of the presently described apparatus and method of its use.

BRIEF DESCRIPTION OF THE SEVERAL VIEWS OF THE DRAWING(S)

Illustrated in the accompanying drawing(s) is at least one of the best mode embodiments of the present invention In such drawing(s):

DETAILED DESCRIPTION OF THE INVENTION

The above described drawing figures illustrate the described apparatus and its method of use in at least one of its preferred, best mode embodiment, which is further defined in detail in the following description. Those having ordinary skill in the art may be able to make alterations and modifications to what is described herein without departing from its spirit and scope. Therefore, it should be understood that what is illustrated is set forth only for the purposes of example and should not be taken as a limitation on the scope of the present apparatus and its method of use.

Figure 1:
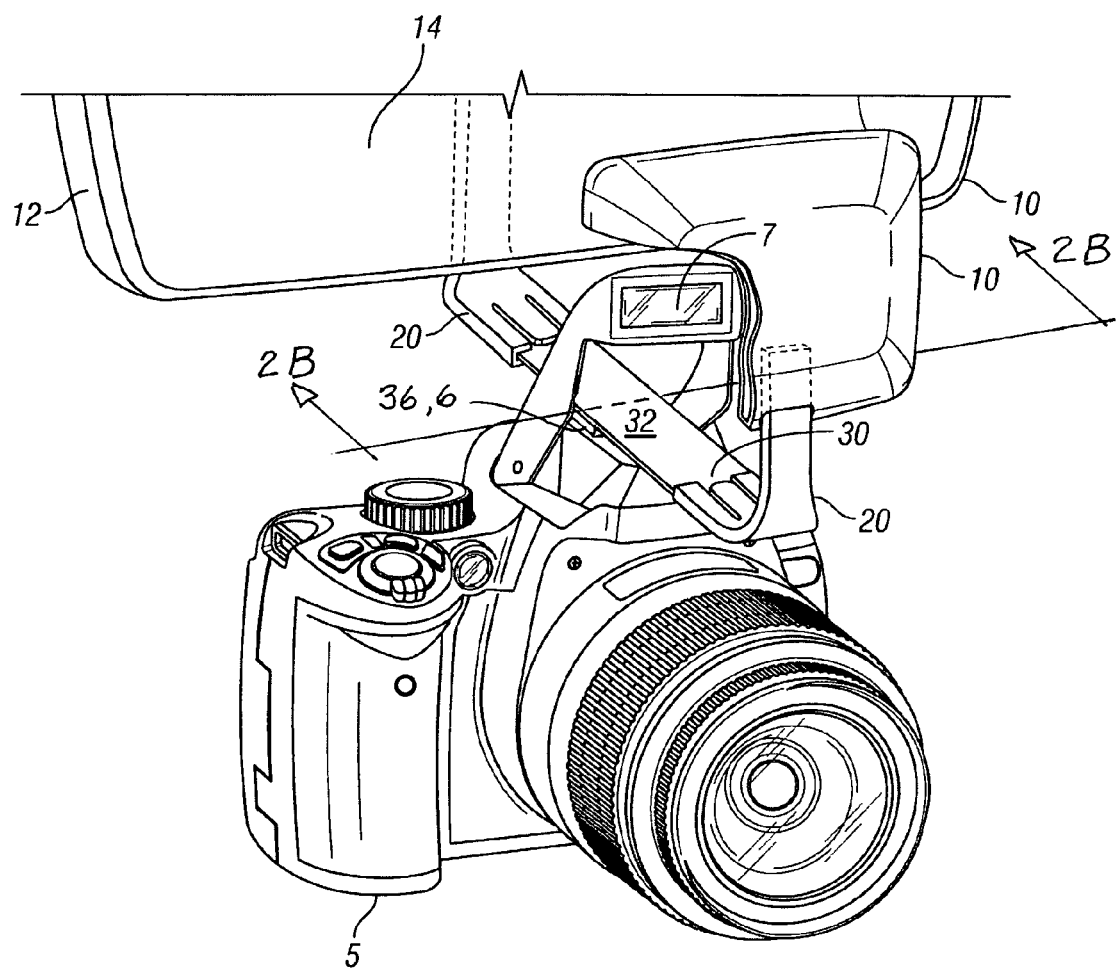
FIG. 1 is a perspective view, in a first embodiment, of the presently described apparatus as mounted on a camera, and in a further embodiment is a combination as also described. A smaller one of a pair of reflectors is partially cut-away in order to more clearly view certain details of the invention camera interface.

Described now in detail is a camera accessory flash reflector system, as shown in FIG. 1, comprising a pair (first and second) of reflector assemblies 10, each having a reflector housings 12 engaging a reflector 14 and a housing support 20. The two reflector assemblies 10 are essentially identical to each other in construction with the exception, as shown in the figures, that one of the assemblies 10 is significantly larger than the other of the assemblies 10. Furthermore, the shape of the two reflectors 14 are likely different since each of the reflectors 14 plays a slightly different role in meeting the objectives of the invention, as will be described below. Each of the reflectors 14 has a (first and second) reflective surface.

Figure 2A:
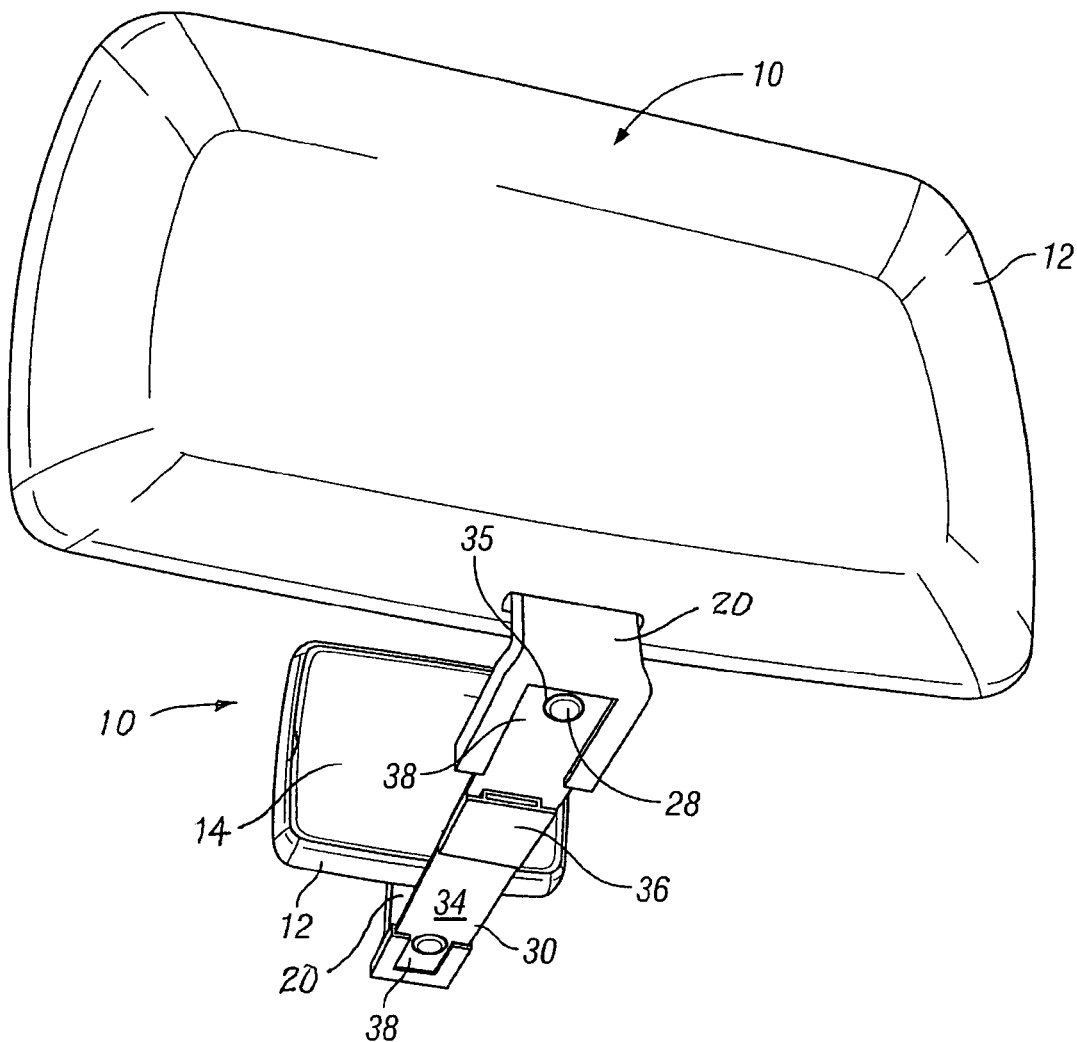
FIG. 2A is a perspective view thereof as seen from below.
Figure 2B:
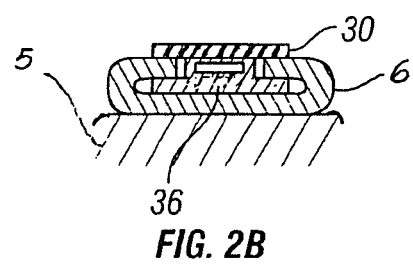
FIG. 2B is a section view showing the engagement of a support strut of the invention as engaging an accessory shoe of the camera.
Figure 4:
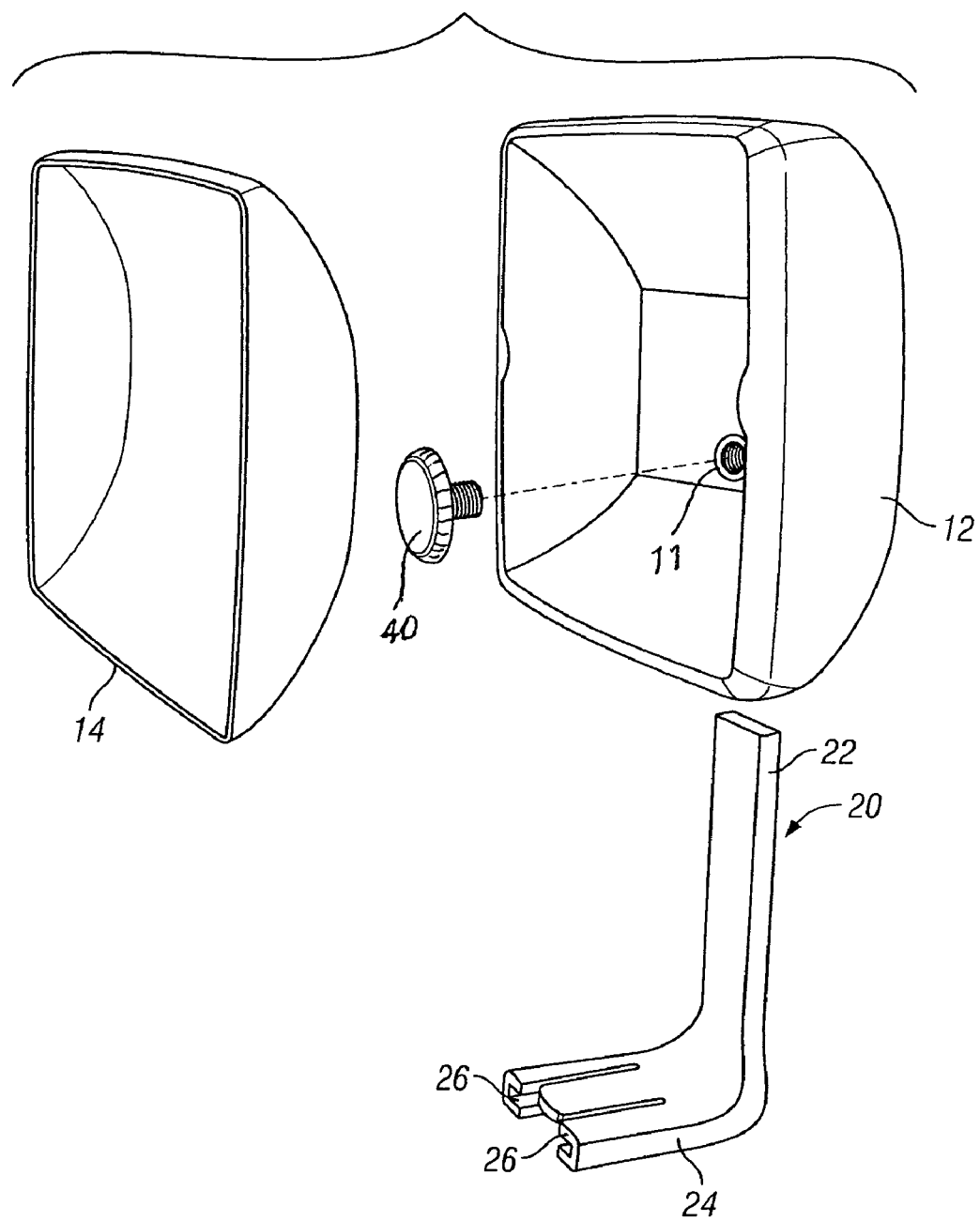
FIG. 4 is an exploded perspective view of the reflector assembly.

The housing supports 20 are each configured with a post 22 and a strut receiver 24 as best shown in FIG. 4 and the post 22 and strut receiver 24 are preferably nominally at approximately right angles to each other. The post 22 that engages the larger of the two reflector housings 12 is longer than the post 22 that engages the smaller of the reflector housings 12. The housing support 20 is preferably an injection molded part. As shown in FIG. 2A, the housing supports 20 are mounted in spaced apart positions on an elongated, preferably linear, support strut 30, with both of the posts 22, in common, directed away normally from a top surface 32 of the support strut 30. The reflectors 14 are arranged to mutually face each other as shown in FIGS. 1 and 2A so that light may be efficiently bounced between them. A bottom surface 34 (FIG. 2A) of the support strut 30 is integral with a fitting, that is, a camera shoe mount 36 which fitting is positioned medially between the two housing supports 20. It is considered to be highly novel to mount the reflector housings 12 on the support strut 30 as this is convenient for mounting on a camera accessory shoe 6 of a camera 5. Furthermore, this arrangement is not obvious in light of the prior art since normally, the camera shoe 6 is not below the flash unit 7. The present arrangement is highly unconventional.

Figure 3:
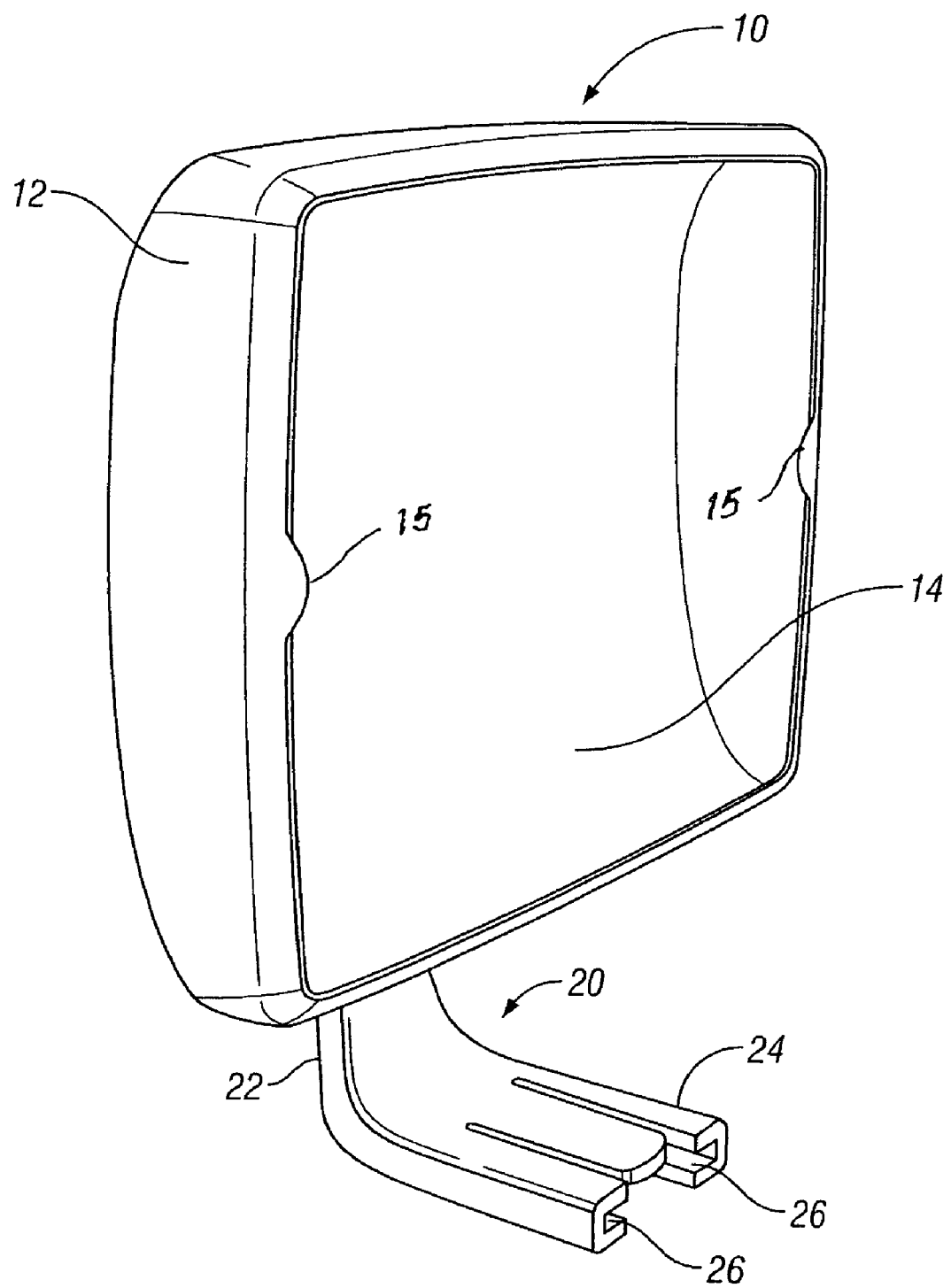
FIG. 3 is a perspective view of a reflector assembly and support thereof.

Preferably, the reflector housings 12 are slidingly mounted on posts 22 (FIG. 4) and the strut receivers 24 are configured for engaging ends 38 of the support strut 30. The resultant assembly is as shown in FIG. 2A. The strut receivers 24 each have a pair of opposing slots 26, as shown in FIG. 3, wherein the slots 26 are spaced for compressively engaging edges of support strut 30 when the ends 38 of the support strut 30 are pressed axially into slots 26. It should be noted that housing support 20 is made of a slightly elastic material so that as support strut 30 is forced into slots 26, the slots are elastically forced apart so as to compressively produce a clamping force onto the support strut 20 so that the engagement between these two components is secured. Finally, to fully secure this engagement, strut receiver 24 has a protrusion 28 located as shown in FIG. 2A, and ends 38 of the support strut 30 have apertures 35, whereby with the ends 38 pressed into slots 26, the apertures 35 engage the protrusions 28.

Preferably, each reflector housing 12 peripherally engages its reflector 14 in a snap-in type fastening so that alternate reflectors 14 may be substituted for each other within reflector housing 12. Such substitute reflectors 14 may have differing reflective surfaces, such as highly polished, matte finish, and so on, reflecting more or less light as desired for a given photographic situation. Other variables may be applied to different reflectors 14 such as reflectors that preferentially reflect certain colors, or that have a surface that disburses incident light in a particular manner, such as wide, narrow, focused, unfocused, and so on. The snap-in enablement is shown in FIG. 3 where portions 15 along both sides of housing 12 bulge outwardly requiring the sides of housing 12 to flex outwardly when inserting or removing a reflector 14 and these portions 15 then contain the reflector 14 in place.

As shown in FIG. 4, the reflector housing 12 has a threaded insert 11 mounted in a position adjacent to where post 22 is positioned. A finger screw 40 threadedly engages the insert 11 and presses against post 22 to lock the reflector housing 12 at a desired position on post 22. Other means for locking are well known in the art.

In use, the present invention, as shown in FIG. 1, is mounted on the accessory shoe of the camera 5 with the two reflector assemblies 10 positioned as shown, the smaller one in front of the camera's flash device 7, and the larger one behind the camera's flash device 7. The smaller reflector assembly 10 is locked into position, a vertical adjustment, on its post 22 so that a maximum amount of light from the flash device 7 falls onto its reflector 14 and is therefore reflected rearwardly toward the larger of the reflector assemblies 10. Next, the larger reflector assembly 10 is locked in a position on its post 22 so that a maximum amount of light from the smaller reflector assembly 10 falls on the lens 14 of the larger reflector assembly. These locking adjustments are made using finger screw 40. Finally, a reflector type and color is selected for each of the reflector assemblies 10 suitable for the photographic activity contemplated.

In a further embodiment of the present invention is a combination apparatus including the flash photography reflector system described above and the camera 5 with its accessory mounting shoe 6 and flash unit 7. This is shown in FIG. 1.

The embodiments described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. A flash photography reflector system comprising:
a first reflector assembly having a first reflective surface;
a second reflector assembly having a second reflective surface larger than the first reflective surface;
a support strut engaging a fitting for a camera shoe;
the first and second reflector assemblies mounted on the support strut with the first and second reflective surfaces in spaced apart positions and mutually facing.

2. The flash photography reflector system of claim 1 wherein at least one of the reflector housings is selectively positionable on a post.

3. The flash photography reflector system of claim 2 wherein at least one of the reflector housings has a means for locking the reflector housing selectively over a range of positions on the post.

4. The flash photography reflector system of claim 1 wherein the reflector housings are mounted on ends of the support strut with the fitting positioned medially.

5. The flash photography reflector system of claim 1 wherein each reflector housing peripherally engages a reflector in a snap-in engagement.

6. A flash photography reflector system comprising in combination:
- a camera having a flash unit, wherein the flash unit is positionable above an accessory shoe of the camera; and
- a flash photography reflector system including:
    - a first reflector assembly having a first reflective surface;
    - a second reflector assembly having a second reflective surface larger than the first reflective surface;
    - a support strut engaging a fitting engaged in the accessory shoe; wherein
    - the first and second reflector assemblies are mounted on the support strut with the first and second reflective surfaces in spaced apart positions and mutually facing, and with the flash unit therebetween.

7. The flash photography reflector system of claim 6 wherein at least one of the reflector housings is selectively positionable on a post.

8. The flash photography reflector system of claim 7 wherein at least one of the reflector housings has a means for locking the reflector housing selectively over a range of positions on the post.

9. The flash photography reflector system of claim 6 wherein the reflector housings are mounted on ends of the support strut.

10. The flash photography reflector system of claim 1 wherein each reflector housing peripherally engages a reflector in a snap-in engagement.

* * * * *